United States Patent
Rooke et al.

(10) Patent No.: US 9,754,558 B2
(45) Date of Patent: Sep. 5, 2017

(54) HEADS-UP SCROLLING

(75) Inventors: Ben Rooke, Santa Clara, CA (US); Dexter A. Dorris, Santa Clara, CA (US); Wesley Powell, San Jose, CA (US)

(73) Assignee: APPLE INC., Cupertino, CA (US)

( * ) Notice: Subject to any disclaimer, the term of this patent is extended or adjusted under 35 U.S.C. 154(b) by 1139 days.

(21) Appl. No.: 13/601,953

(22) Filed: Aug. 31, 2012

(65) Prior Publication Data

US 2013/0335455 A1    Dec. 19, 2013

Related U.S. Application Data

(60) Provisional application No. 61/661,149, filed on Jun. 18, 2012.

(51) Int. Cl.
*G06F 3/048* (2013.01)
*G09G 5/34* (2006.01)
*G06F 3/0485* (2013.01)

(52) U.S. Cl.
CPC ........... *G09G 5/34* (2013.01); *G06F 3/04855* (2013.01); *G09G 2340/12* (2013.01)

(58) Field of Classification Search
None
See application file for complete search history.

(56) References Cited

U.S. PATENT DOCUMENTS

| | | | |
|---|---|---|---|
| 6,476,831 B1 | 11/2002 | Wirth et al. | |
| 7,523,412 B2 | 4/2009 | Jones et al. | |
| 9,035,887 B1 * | 5/2015 | Prud'Hommeaux | .. A63B 21/00 345/173 |
| 2004/0125128 A1 * | 7/2004 | Chang | ................... G06F 3/0486 715/730 |
| 2008/0155464 A1 * | 6/2008 | Jones | .................... G06F 3/0481 715/787 |
| 2012/0030614 A1 | 2/2012 | Tuli | |

OTHER PUBLICATIONS

NPL-1—PHP Maker 5, "PHPMaker 9—The Best PHP Code Generator", http://www.hkvstore.com/phpmaker/phpmaker5.asp, Downloaded on Jun. 8, 2012. 5 pages.
NPL-2—Change Textbox Values With Scrollbar, Excel, http://excel.bigresource.com/Track/excel-eZR9T71S/. Downloaded on Jun. 8, 2012. 1 page.

* cited by examiner

*Primary Examiner* — William Trapanese
(74) *Attorney, Agent, or Firm* — Downey Brand LLP (57) ABSTRACT

Methods, program products, and systems for heads-up scrolling are described. In heads-up scrolling, a scrolling control can be used to scroll through multiple data records in a database. When a slider of the scrolling control receives an input dragging the slider, a semitransparent window can be overlaid on content being displayed. The semitransparent window can have a user-specified layout for formatting one or more data fields of a data record. When the slider is dragged, the content being overlaid upon can remain static. Content in the semitransparent window can be updated to reflect content in a data record corresponding to a position of the slider. The content in the semitransparent window can be formatted according to the user-specified layout, which may be different from a format of the content under the semitransparent window.

27 Claims, 7 Drawing Sheets

HEADS-UP SCROLLING

CROSS-REFERENCE TO RELATED APPLICATIONS

Under 35 U.S.C. §119, this application claims benefit of U.S. Provisional Application Ser. No. 61/661,149, filed Jun. 18, 2012, the entire contents of which are hereby incorporated by reference.

TECHNICAL FIELD

This disclosure relates generally to graphical user interfaces.

BACKGROUND

In a graphical user interface (GUI), a scrollbar can be used to navigate through content that is too large to fit into a window entirely. The content can include continuous text, image, or data records from a database. A scrollbar can have a track and a slider that can be dragged along the track. The slider is also known as a thumb, an elevator, a wiper, a grip, a scroller, a navigation slider, or by many other names. When the slider is dragged along the track, various portions of the content can be shown in the window. Typically, a scrollbar includes navigation arrows on each end such that a user can navigate using the arrows without using the slider. The slider can have variable size reflecting a ratio between displayed content and entire content.

SUMMARY

Methods, program products, and systems for heads-up scrolling are described. In heads-up scrolling, a scrolling control can be used to scroll through multiple data records in a database. The scrolling control can be displayed with content that includes one or more of the data records. When a slider of the scrolling control receives an input dragging the slider, a semitransparent window can be overlaid on content currently being displayed. The semitransparent window can have a user-specified layout for formatting one or more data fields of a data record. When the slider is dragged, the content under the semi-transparent window can remain static. Content in the semitransparent window can be updated to reflect content in a data record corresponding to a position of the slider. The content in the semitransparent window can be formatted according to the user-specified layout, which may be different from a format of the content under the semi-transparent window.

In some implementations, a method of heads-up scrolling can include receiving, from a user interface, an input touching a slider of a scrolling control. The scrolling control can correspond to multiple data record rows in a database. Each data record can include one or more data fields. While the slider is receiving the input, the user interface can provide a heads-up display of a data record. The data record can be identified from the data record rows based on a current position of the slider on the scrolling control. The heads-up display can include a data field preselected from the one or more data fields according to a user-specified layout, and provide a preview of the data record. The user interface can update the heads-up display when an input moves the slider along the scrolling control.

Heads-up scrolling can be implemented to achieve the following advantages. A user can view content being scrolled in a user-specific way, for example, by selectively viewing one or two data fields the user considers most representative of a data record, rather than all data fields in the data record, which may clutter a display screen. The data being viewed can be displayed in a heads-up display semi-transparently overlaid on content being scrolled, such that conventional advantages of content scrolling are preserved. Content in the heads-up display can be pre-fetched from the database, such that scrolling speed is unaffected or minimally affected by the heads-up display. The pre-fetched content can include only a small portion of each record, such that memory overhead is minimized.

The details of one or more implementations of heads-up scrolling are set forth in the accompanying drawings and the description below. Other features, aspects, and advantages heads-up scrolling will become apparent from the description, the drawings, and the claims.

BRIEF DESCRIPTION OF THE DRAWINGS

Like reference symbols in the various drawings indicate like elements.

DETAILED DESCRIPTION

HUD Window

Figure 1:
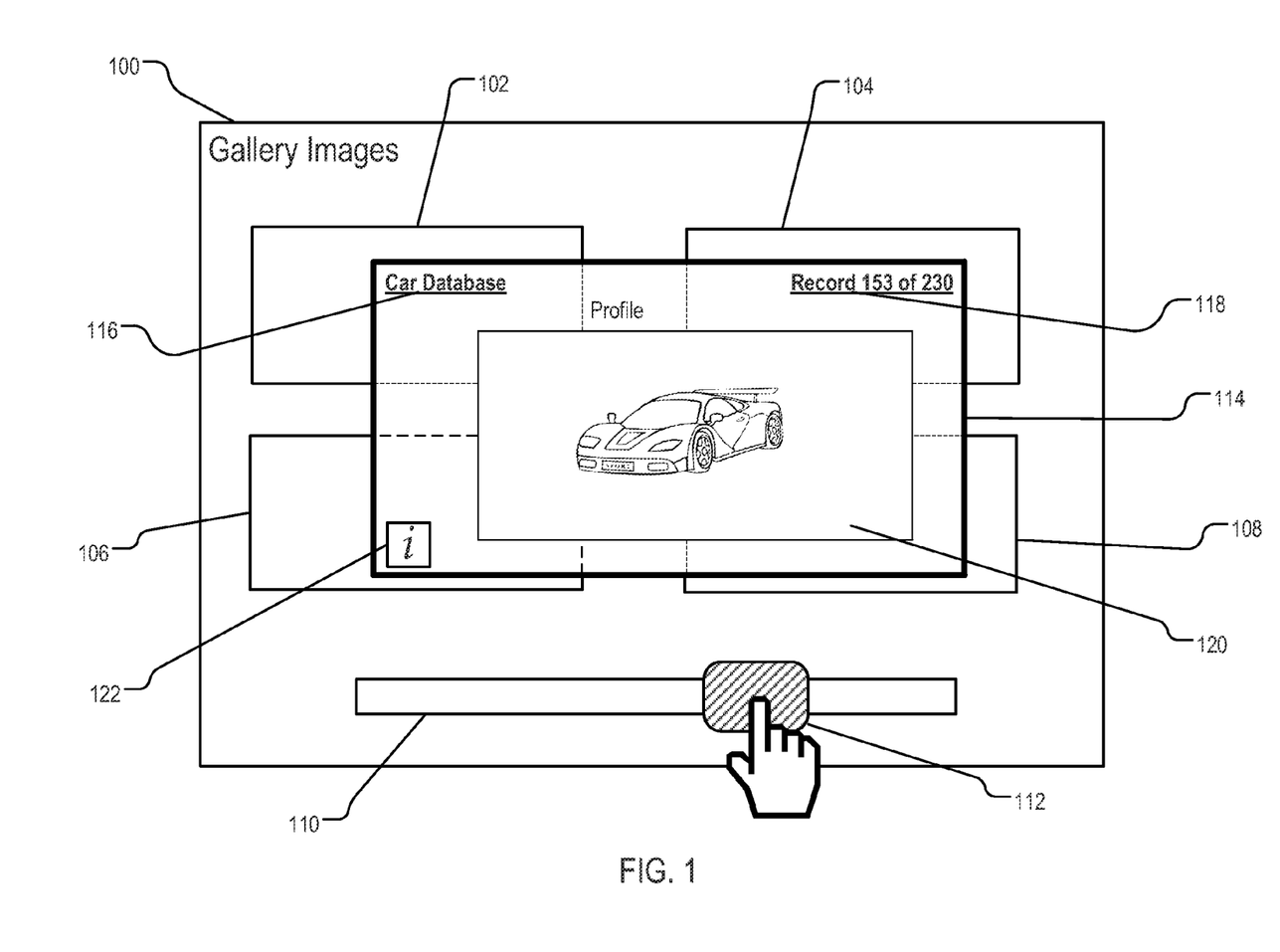
FIG. 1 illustrates an exemplary heads-up scrolling user interface.

FIG. 1 illustrates exemplary heads-up scrolling user interface 100. User interface 100 can be a graphical user interface for viewing data in a database that stores multiple data records. Each data record can have multiple data fields. User interface 100 can include a form view, where data records are displayed one at a time. The form view can be displayed on a display screen of a user device. Data fields 102, 104, 106, and 108 can be displayed according to a layout. The layout can contain formatting information, including, for example, location, size, font, or color, for each of the data fields.

User interface 100 can include scrolling control 110. Scrolling control 110 can be a user interface item for controlling how to browse through the multiple data records when one record is displayed at a time. Scrolling control 110 can have slider 112, which can be touched and dragged along a track. A position of slider 112 on the track can indicate a relative position of a data record currently being displayed. Scrolling control 110 can be a scrubber, where a size of slider 112 is fixed, or a scrollbar, where a size of slider 112 is variable. When slider 112 receives a touch input from a finger, a stylus, or a mouse click followed by dragging, slider 112 can move along the track. When the finger or stylus leaves slider 112 or a mouse button is released, a new data record is selected and displayed in user interface 100 according to a final position of slider 112 at time of release. The data record may have many data fields. The database transaction cost may be high. For example, if the database is stored remotely from the user device, the cost in memory usage, CPU usage, or network usage of updating data fields 102, 104, 106, and 108 while slider 112 moves can be high.

When slider 112 is being dragged, the user device can provide heads-up display (HUD) window 114 for display in user interface 100. HUD window 114 can correspond to a predicted data record that, if the finger or stylus stops touching slider 112, will be displayed in user interface 100 in a complete form view. HUD window 114 can include a semi-transparent window overlaid on data fields 102, 104, 106, and 108. HUD window 114 can display database name 116 of a database, position information 118 indicating a current position of the predicted data record among all data records in the database, data field 120 of the predicted data record, and HUD editor control 122.

Data field 120 can be a data field selected from multiple data fields of a data record. Data field 120 can be formatted according to a layout dedicated for HUD window 114. The layout can be the same or different from the layout underlying user interface 100. The layout can be user editable. Content of HUD window 114 can be overlaid, or superimposed, on the currently displayed data fields 102, 104, 104, and 108 such that data fields 102, 104, 106, and 108 are visible through HUD window 114. The portions of data fields 102, 104, 106, and 108 visible through HUD window 114 can be darkened or otherwise de-emphasized to appear as if displayed behind a piece of semi-transparent or dark glass.

When slider 112 is dragged along the track, content of HUD window 114, e.g., position information 118 and content in data field 120, can be updated according to position of slider 112 on track of scrolling control 110. User interface 100 can remain focused on the current data record. The content in data fields 102, 104, 106, and 108 can be static while slider 112 slides, even when content in HUD window 114 changes. The content in data fields 102, 104, 106, and 108 can be maintained until slider 112 is released, e.g., when a stylus or finger leaves slider 112. In some implementations, the content in data fields 102, 104, 106, and 108 can be updated according to a data record corresponding to a final position of slider 112 after a threshold time has passed since slider 112 is released. For example, if the threshold time is set to two seconds, when (1) the final position of slider 112 corresponds to data record number "153," and (2) currently, the content in data fields 102, 104, 106, and 108 is from data record number "15," the content in data fields 102, 104, 106, and 108 can be updated according to data record "153" two seconds after slider 112 is released. If, during the threshold time, an input is received through HUD editor control 122, a HUD editor can be displayed for editing the layout for HUD window 114. Additional details of the HUD editor will be described below in reference to FIG. 2.

HUD Editor

Figure 2:
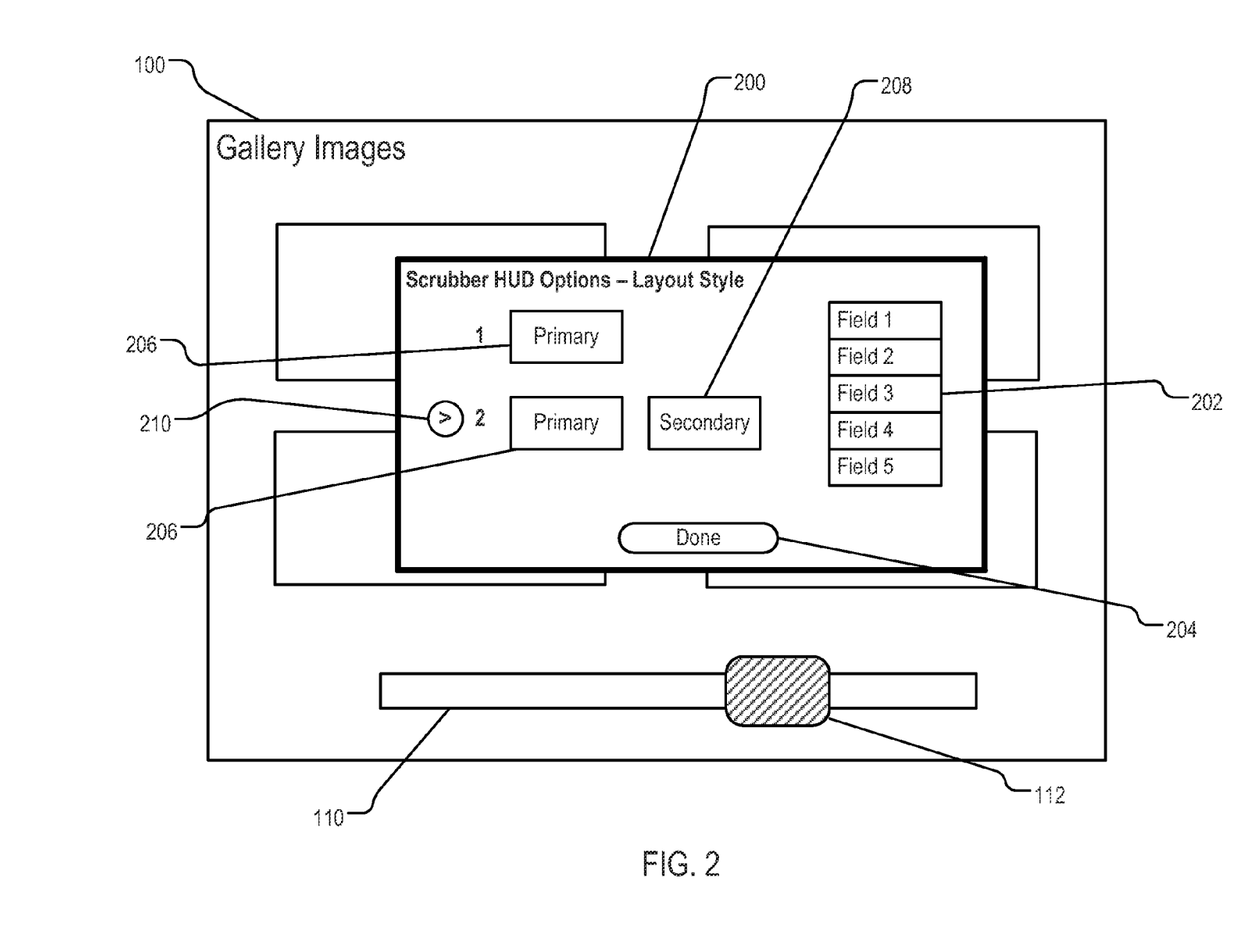
FIG. 2 illustrates an exemplary user interface for configuring a heads-up display window.

FIG. 2 illustrates an exemplary user interface for configuring a heads-up display window. The user interface can include HUD editor 200. HUD editor 200 can be activated using HUD editor control 122 of FIG. 1.

HUD editor 200 can include field list 202. Field list 202 can be a list of data fields for a set of data records as stored in a database. HUD editor 200 can receive a user input selecting one or more data fields from field list 202 and placing the selected one or more fields each at a location in HUD editor 200. The selection and placement can create or modify a layout for a HUD window. A list of selected data fields and the layout can be stored on a storage device when HUD editor 200 receives an input through user interface item 204, which can be a "Done" button for saving data.

In some implementations, HUD editor 200 can configure a HUD window to display a data field designated for sorting the data records. Data records can be browsed in multiple levels of sort order, for example, ascending according to a primary data field designated for sorting, and then descending according to a secondary data field. HUD editor 200 can provide the sorting data fields for a user to select for a HUD window. For example, HUD editor 200 can provide for display option 1, where primary sort field 206 can be selected as a data field for displaying in a HUD window. HUD editor 200 can provide for display option 2, where both primary sort field 206 and secondary sort field 208 can be selected as data fields for displaying in a HUD window. Two sort fields are shown in this example. Additional sort fields can be listed.

HUD editor 200 can receive a selection of option 1 or option 2 when HUD editor 200 receives an input (e.g., a touch input) on option 1 or option 2. Sort field indicator 210 can indicate which option is selected.

When HUD editor 200 selects data fields according to a sort order, content in a resulting HUD window can update less frequently than when the data fields are unsorted. Because data records are sorted based on a sort data field, content in the HUD window can be updated only when content of the sort data field change. Content of the sort data field can remain unchanged until multiple data records have been browsed. Accordingly, selecting data fields according to a sort order can reduce cache size, network load, or CPU time. Additional details on the operations of HUD window for multiple levels of sorts are described below in reference to FIG. 3.

Figure 3:
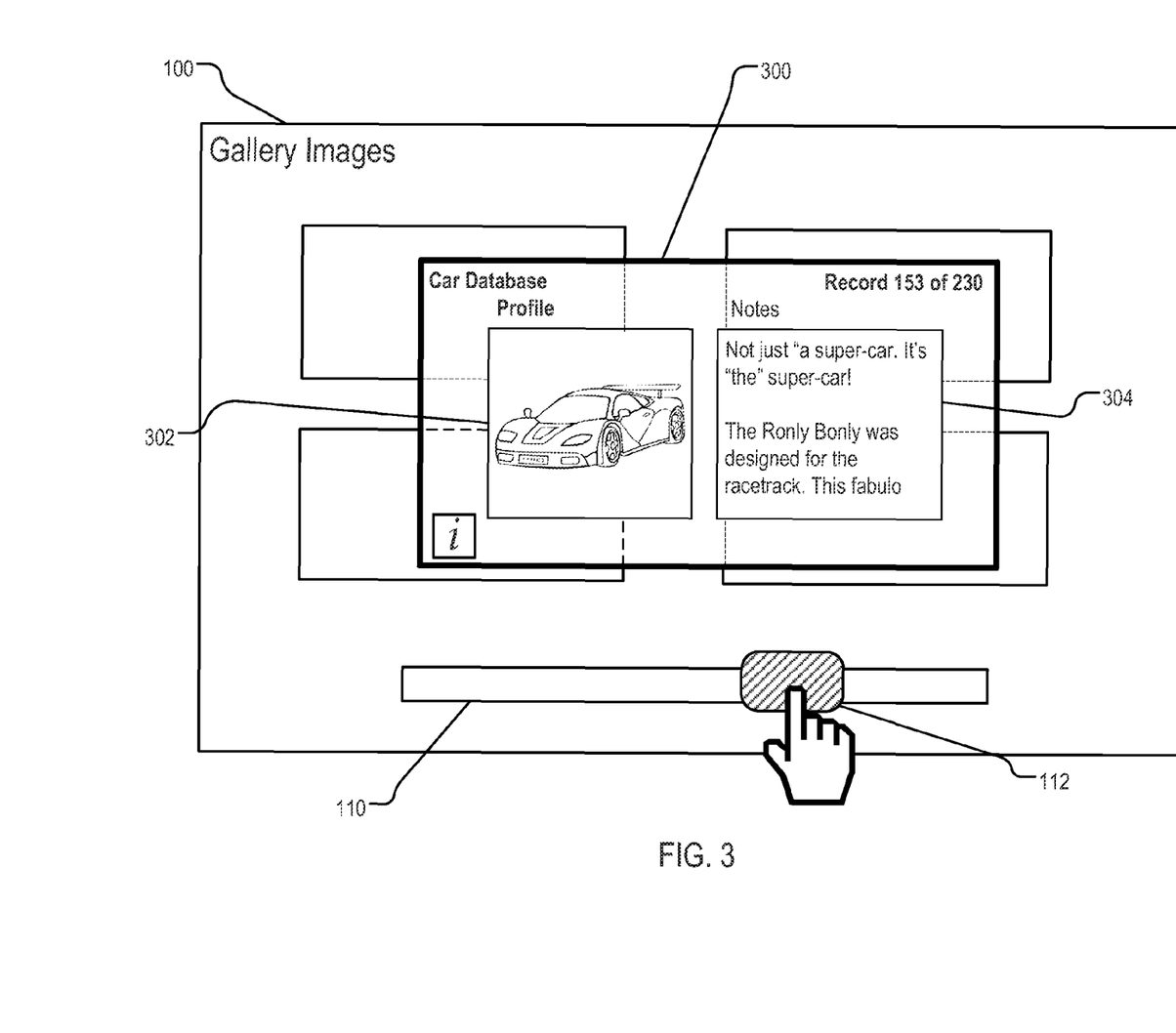
FIG. 3 illustrates an example heads-up scrolling user interface for multiple levels of sorts.

FIG. 3 illustrates an example heads-up scrolling user interface for multiple levels of sorts. HUD window 300 can include primary sort field 302 and secondary sort field 304. Primary sort field 302 can be an image data field. For example, data records in a database can be sort primarily on size of an image in the image data field. Accordingly, data records having a same image (e.g., records of cars having a same make, model, and trim having a same title image) can be grouped together. Secondary sort field 304 can be a text data field. Data records that have the same image can be further sorted by the text data field. For example, data records of cars having a same make, model, and trim can further be sorted by option packages.

When slider 112 receives a touch input, a HUD management module can connect to a database through a database interface and retrieve data records including the data fields for displaying in HUD window 300. In this example, the data fields can be primary sort field 302 and secondary sort field 304. The retrieved data fields can be associated with a row identifier indicating which data record had what value in the data fields. The management module can store the retrieved row identifier and the values of the data fields in a HUD buffer. The HUD buffer can be indexed, such that the total amount of storage is less that the number of user-selected data records times the number of each data record.

When slider 112 moves, the management module can update content in secondary sort field 304 only when the content in secondary sort field 304 changes. The change may occur after multiple data fields have been bypassed. Likewise, the management module can update content in primary sort field 302 only when the content in primary sort field 302 changes. The change may occur after multiple updates in secondary sort field 304, instead of occurring at every slight movement of slider 112.

If a sort order of a database changes, e.g., by a database management program, sort fields 302 and 304 can change accordingly. The change in sort field 302 and 304 can be synchronized with external changes, including changes in sort order (e.g., from a first data field to a second data field), or changes of position of current data record due to insertion or deletion of data records or modification of data field values (e.g., changing one image to another). In some implementations, when an external program changes the sort order, the displayed content in HUD window 300 can remain static; slider 112 can jump to a new position to reflect the change in sort order. If content in a data field in a field currently displayed in HUD window 300 changes, displayed content in sort field 302 or 304 may change. Slider 112 can remain at a current position if the change in content does not result in a change in rank of the currently displayed record (e.g., 153 out of 230), or jump to another position if the change in content results in a change in rank of the currently displayed record (e.g., from 153 out of 230 to 59 out of 230).

Figure 4:
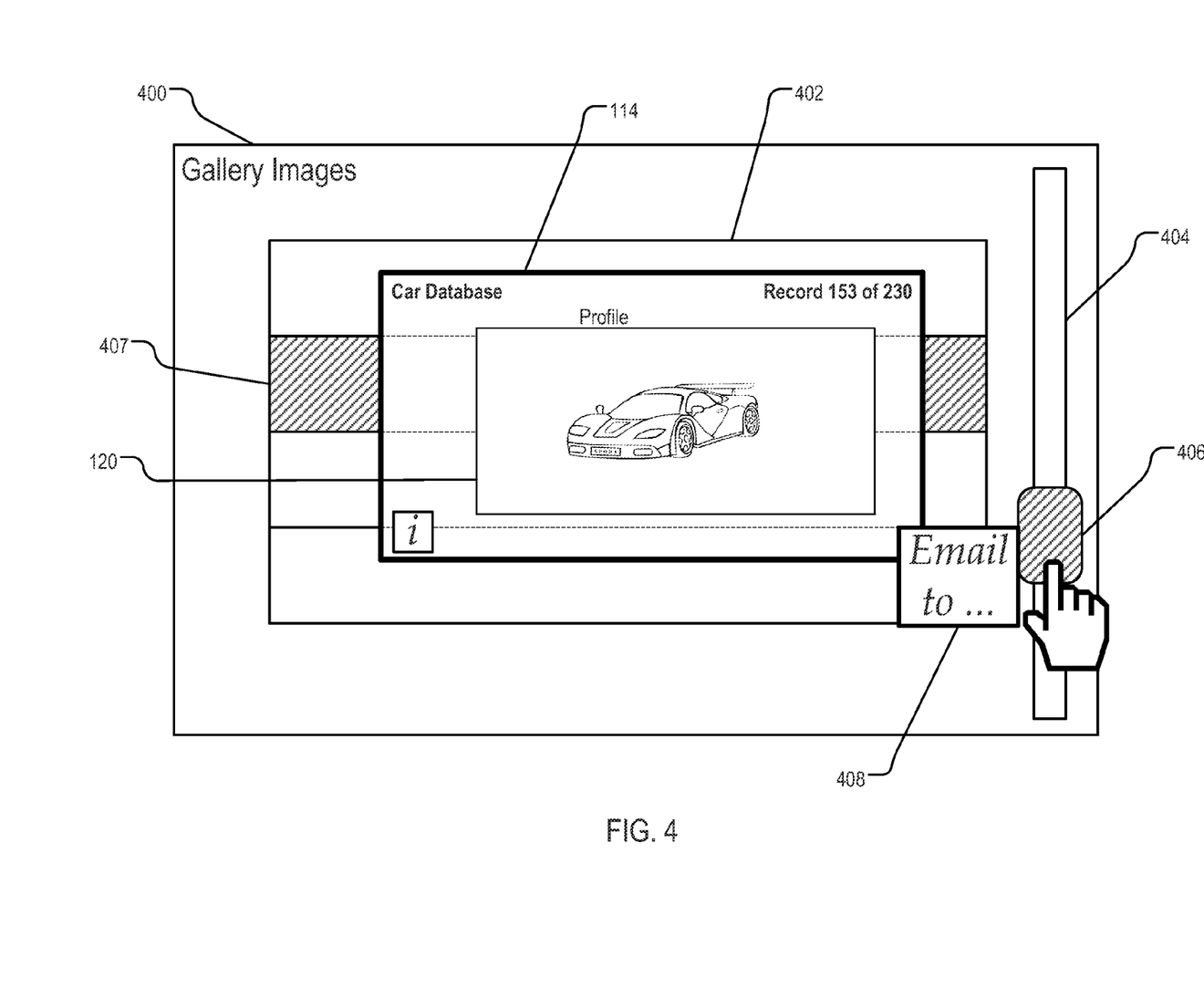
FIG. 4 illustrates an exemplary heads-up display window overlaid on a table view.

FIG. 4 illustrates an exemplary heads-up display window overlaid on a table view. User interface 400 can be a graphical user interface for viewing data in a database that stores multiple data records. Each data record can have multiple data fields. User interface 400 can include table view 402 and scrolling control 404, which includes slider 406. Scrolling control 404 can be a vertical scrolling control in which slider 406 moves vertically.

Table view 402 can be a view of database data that displays multiple data records each time. The multiple data records can be displayed in a tabular format in which, for example, each data record is displayed as a row, and data fields in the data record are displayed as columns.

When slider 406 receives an input moving slider 406 up or down, table view 402 can remain static. Rows of data records displayed in table view need not change. For example, data record 407 can be a data record in focus, e.g., being selected and ready to open for display in a form view. While slider 406 moves up or down, data record 407 can remain in focus. Focus can be changed when slider 406 is released. While slider 406 moves up or down, content in data field 120 of HUD window 114 can change in a manner that reflects the current row of data as determined by a position of slider 406. For example, if slider 406 is located at a position in sliding control 404 that corresponds to data record number 153, an image in data field 120 can correspond to an image of an image data field of data record number 153. HUD window 114 can be semitransparent, such that the records of table view 402 can be visible through HUD window 114.

HUD window 114 can be closed, and scrolling control 404 may be removed, when, through any operation, the number of data records in the database falls below two. Scrolling control 404 may be added back when the number of data records in the database increases to two or more.

In some implementations, slider 406 can be associated with action icon 408. Action icon 408 can be displayed when slider 406 receives a touch input. Action icon 408 can be associated with a user-specified action, e.g., sending an email, print a current record, or export a current record being in focus in table view 402, or a predicted data record a data field of which is displayed in HUD window 114. Action icon 408 can receive a selection input, e.g., a touch input. Upon receiving the selection input, action icon 408 can cause the user-specified action to be performed.

Exemplary System Components

Figure 5:
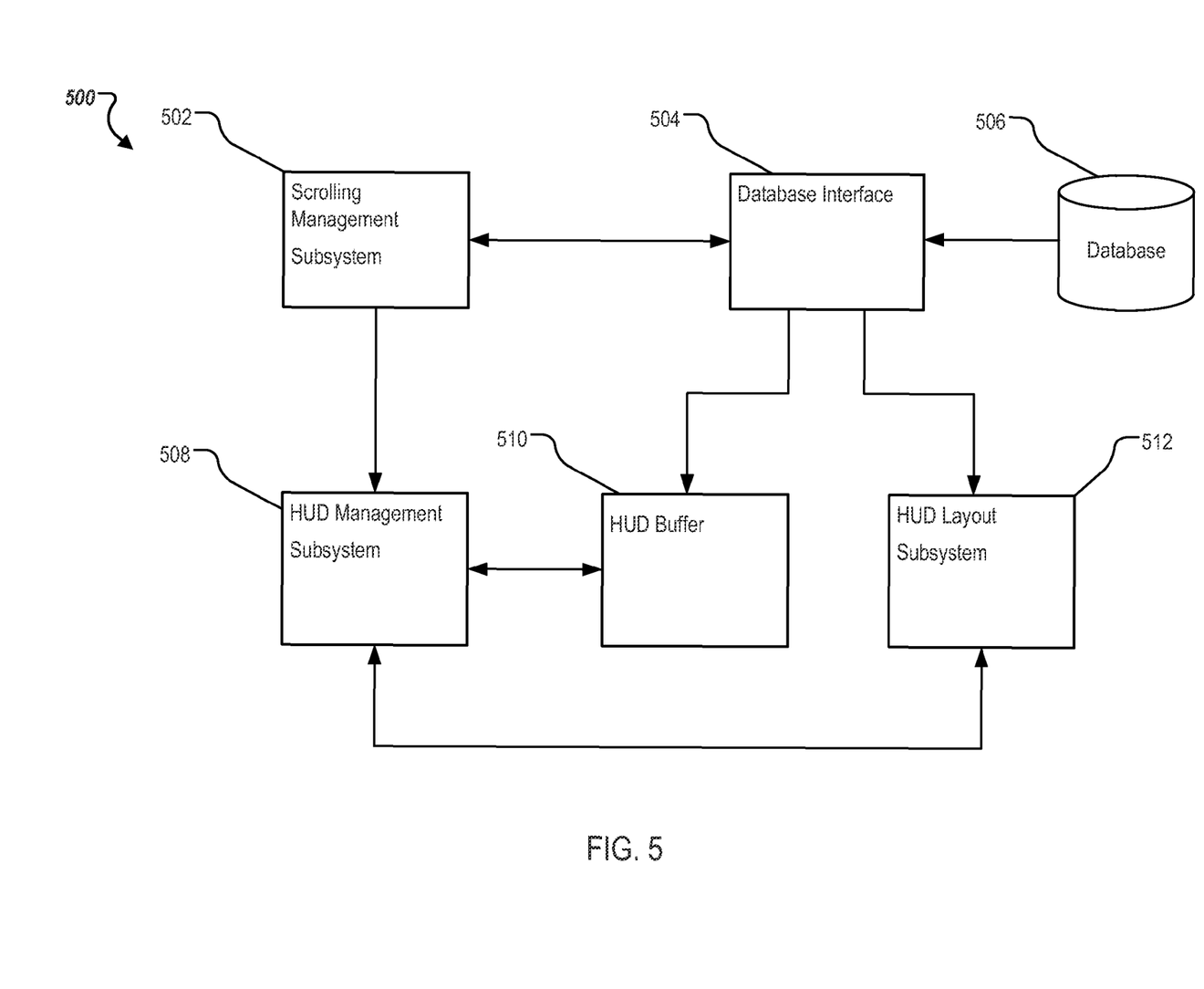
FIG. 5 is a block diagram of a system implementing heads-up scrolling features.

FIG. 5 is a block diagram of system 500 implementing heads-up scrolling features. System 500 can include one or more processors programmed to perform heads-up scrolling operations.

System 500 can include scrolling management subsystem 502. Scrolling management subsystem 502 can be configured to manage scrolling controls, e.g., scrolling controls 110 and 404 as described above. System 500 can interact with database interface 504 to obtain a total number of data records in a database table, and to inform database interface 504 which data record is currently being displayed in a form view, or which data record is in focus in a table view. Scrolling management subsystem 502 can determine, based on a position of a slider, one or more predicted data records. A predicted data record can be a data record being browsed that, if a slider of a scrolling control is released, will be displayed in the form view or will be in focus in a table view. The total number of data records (e.g., 10,000 records) can be accessed by a scrolling control can be large compared to a total number of pixels (e.g., 1,000 pixels) of the scrolling control as displayed. Accordingly, a position of a slider can correspond to more than one predicted data records (e.g., 10 data records).

Database interface 504 can determine the total number of data records by performing one or more queries in database 506. Database 506 can be an organized collection of data. Examples of database 506 can be relational databases, object-oriented databases, or ad hoc databases.

System 500 can include HUD management subsystem 508. HUD management subsystem 508 can be configured to manage one or more HUD windows, e.g., HUD windows 114 and 300, and one or more HUD editors, e.g. HUD editor 200. HUD management subsystem 508 can receive, from scrolling management subsystem 502, an identifier of a predicted data record, and a direction of slider movement. Based on the slider position, HUD management subsystem 508 can display selected data fields of a predicted data record in a HUD window. If HUD management subsystem 508 receives multiple identifiers of predicted data records, HUD management subsystem 508 can select, based on the direction of slider movement, one of the predicted data records for display in a HUD window. For example, if the slider moves forward, HUD management subsystem 508 can select a last predicted data record for display in a HUD window; if the slider moves backward, HUD management subsystem 508 can select a first predicted data record for display in a HUD window.

System 500 can include HUD buffer 510. HUD buffer 510 can store one or more data fields for display in a HUD window. The data fields stored in HUD buffer 510 can be correspond to data fields for display in a HUD window. HUD management subsystem 508 can retrieve the data fields from HUD buffer 510 using an identifier of a predicted data record as an index. The data fields stored in HUD buffer 510 can be retrieved from database 506 using database interface 504.

System 500 can include HUD layout subsystem 512. HUD layout subsystem 512 can receive configuration information from HUD management subsystem 508 as provided from a HUD editor. HUD layout subsystem 512 can generate a layout using the configuration and store the layout in association with a database table. The layout can be stored in database 506 through database interface 504. HUD layout subsystem 512 can provide the layout to HUD management subsystem 508 for formatting and displaying a HUD window.

Exemplary Processes

Figure 6:
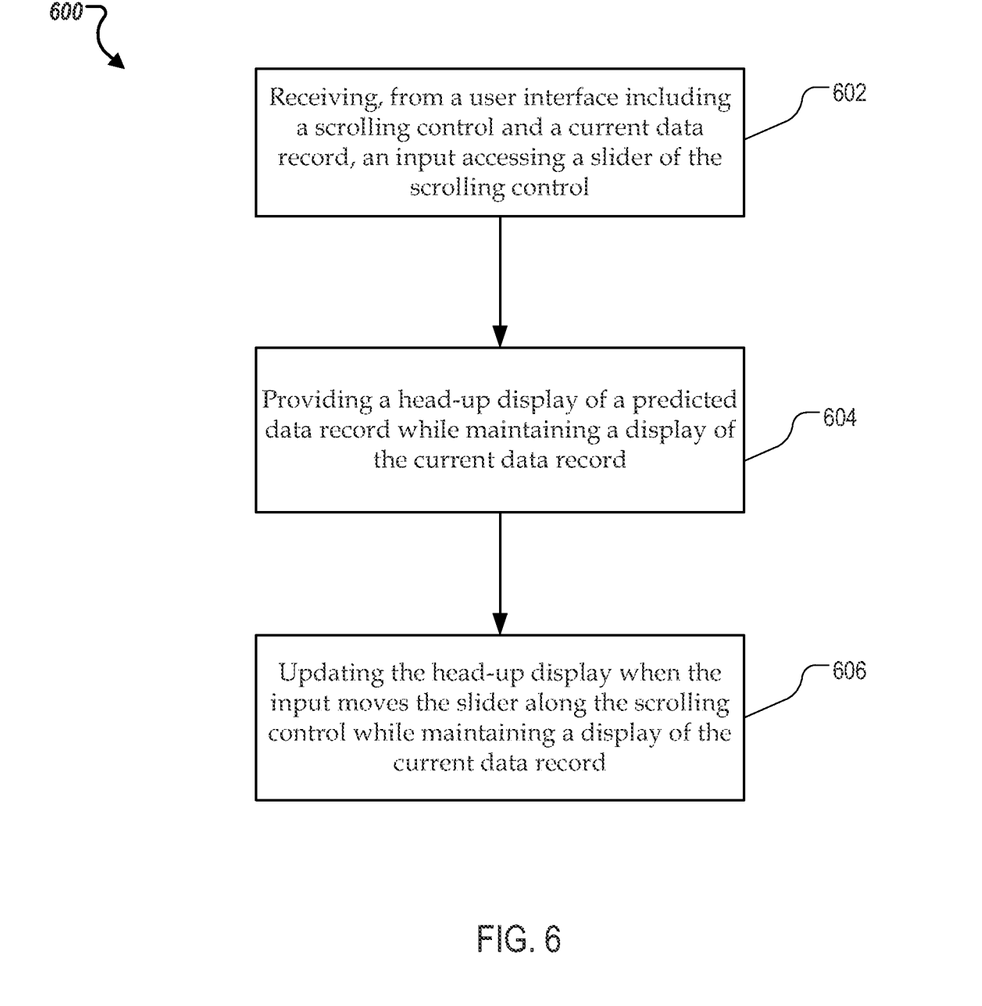
FIG. 6 is a flowchart illustrating an exemplary heads-up scrolling process.

FIG. 6 is a flowchart illustrating exemplary heads-up scrolling process 600. Process 600 can be performed by system, e.g., system 500 as described above in reference to FIG. 5.

The system can receive (602), from a user interface including a scrolling control and a current data record, an input accessing a slider of the scrolling control. The scrolling control can correspond to multiple data record rows in a database. Each data record can include one or more data fields. The current data record can be a data record, among the multiple data records, being displayed or being in focus. In some implementations, the scrolling control can be a scrubber, where the slider has a fixed size regardless of number of data record rows in the database. In some implementations, the scrolling control can be a scrollbar, where the slider has a variable size that correspond to a ratio between a number of displayed data records and a total number of data records. A greater ratio can correspond to a larger slider size.

While the input continues, the system can provide (604) for display a HUD window of a predicted data record. The predicted data record can be identified from the data record rows based on a current position of the slider on the scrolling control. The HUD window, e.g., HUD window 114, can include a preview of the predicted data record. The preview can be overlaid on the current data record. The preview can include a data field preselected from the one or more data fields of the predicted data record. The HUD window can be a semi-transparent window displaying the data field. The HUD window can include a control, e.g., HUD editor control 122. The control, when activated, can cause a HUD editor, e.g., HUD editor 200, to be displayed. The HUD editor can be used to edit a layout of the HUD window. The HUD editor can be used to select the data field from the one or more data fields and configure formatting of the selected data field.

In some implementations, the input can include a touch and a drag on the slider. Upon receiving the touch on the slider, the system can retrieve, from the database, multiple partial data record rows. Each partial data record row can correspond to a data record row and include the preselected data field. The partial data record rows can be stored in HUD buffer 510 of FIG. 5.

IN some implementations, the system can determine a between a count of the data record rows and a length of the slide control as measured in number of pixels. The system can identify the predicted data record for display in the HUD window based on the ratio. The system can identify the predicted data record further based on a scrolling direction.

The system can update (606) the HUD window when the input moves the slider along the scrolling control while maintaining a display of the current data record. In some implementations, the system can determine a first sort order based on a first data field of each of the data record rows and a second sort order on a second data field of each of the data record rows. The system can store unique values of the first data field and unique values of the second data field in a HUD buffer (e.g., HUD buffer 510) on a storage device. The values can be indexed. Updating the HUD window can include displaying new content for the second data field while maintaining content of the first data field.

The system can synchronize the heads-up display and the predicted data record when the predicted data record is changed. The system can detect that the input ceases to access the slider. For example, the system can detect that the slider is released. The system can then select a predicted data record a data field of which is displayed in a last HUD window. The system can then retrieve all data fields of the selected data record for display in a form view.

Exemplary System Architecture

Figure 7:
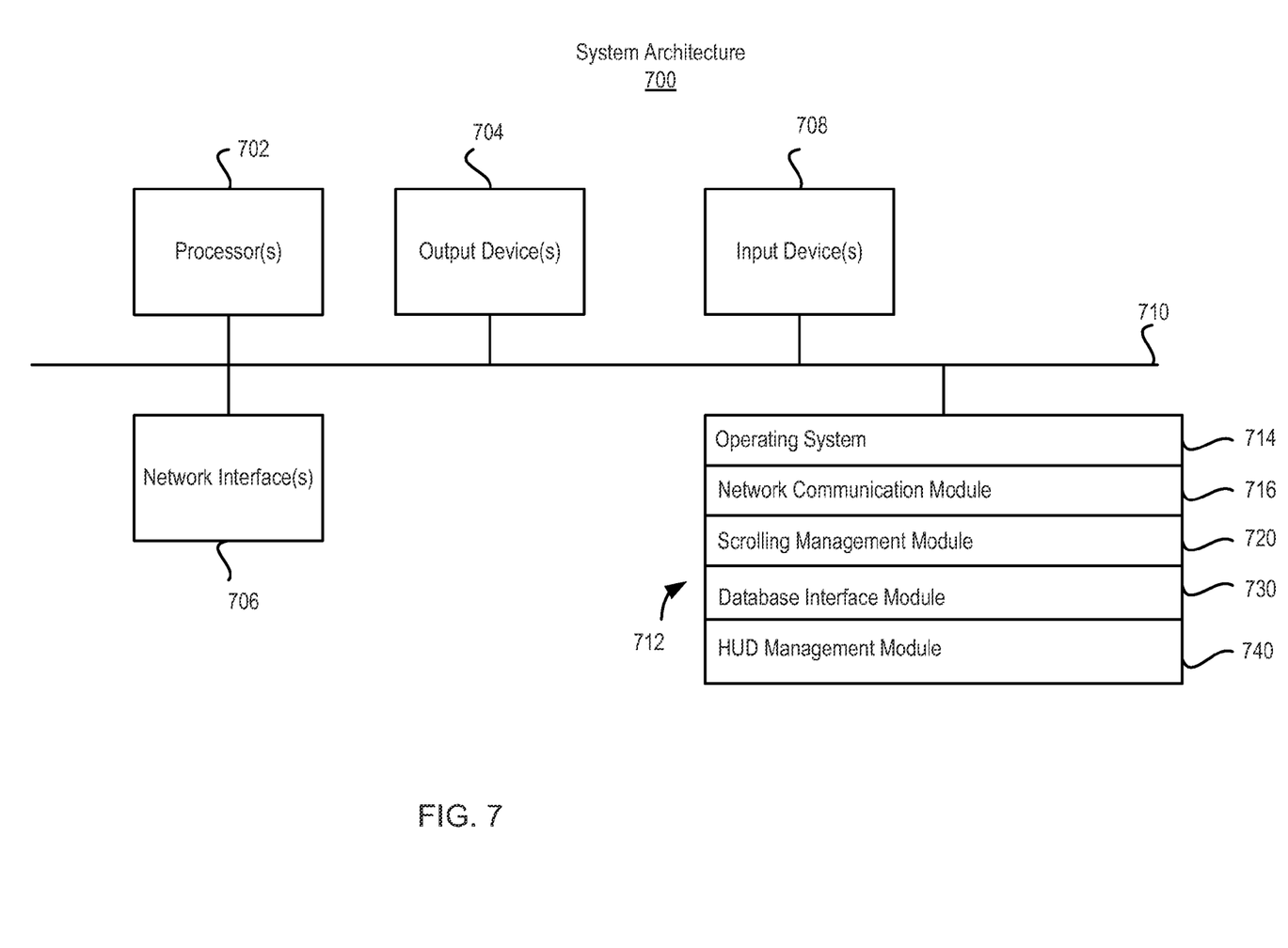
FIG. 7 is a block diagram of an exemplary system architecture for implementing the features and operations of FIGS. 1-6.

FIG. 7 is a block diagram of an exemplary system architecture 700 for implementing the features and operations of FIGS. 1-6. Other architectures are possible, including architectures with more or fewer components. In some implementations, architecture 700 includes one or more processors 702 (e.g., dual-core Intel® Xeon® Processors), one or more output devices 704 (e.g., LCD), one or more network interfaces 706, one or more input devices 708 (e.g., mouse, keyboard, touch-sensitive display) and one or more computer-readable mediums 712 (e.g., RAM, ROM, SDRAM, hard disk, optical disk, flash memory, etc.). These components can exchange communications and data over one or more communication channels 710 (e.g., buses), which can utilize various hardware and software for facilitating the transfer of data and control signals between components.

The term "computer-readable medium" refers to a medium that participates in providing instructions to processor 702 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium 712 can further include operating system 714 (e.g., a Linux® operating system), network communication module 716, scrolling management module 720, database interface module 730, and HUD management module 740. Operating system 714 can be multi-user, multiprocessing, multitasking, multithreading, real time, etc. Operating system 714 performs basic tasks, including but not limited to: recognizing input from and providing output to devices 706, 708; keeping track and managing files and directories on computer-readable mediums 712 (e.g., memory or a storage device); controlling peripheral devices; and managing traffic on the one or more communication channels 710. Network communications module 716 includes various components for establishing and maintaining network connections (e.g., software for implementing communication protocols, such as TCP/IP, HTTP, etc.).

Scrolling management module 720 can include computer instructions that, when executed, cause processor 702 to perform operations of scrolling management subsystem 502 as described above in reference to FIG. 5. Database interface module 730 can include computer instructions that, when executed, cause processor 702 to perform operations of database interface 504 as described above in reference to FIG. 5. HUD management module 740 can include computer instructions that, when executed, cause processor 702 to perform operations of HUD management subsystem 508 as described above in reference to FIG. 5.

Architecture 700 can be implemented in a parallel processing or peer-to-peer infrastructure or on a single device with one or more processors. Software can include multiple software components or can be a single body of code.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor or a touch-sensitive display screen for displaying information to the user and a keyboard and a pointing device such as a mouse or a trackball by which the user can provide input to the computer. The computer can have a voice input device for receiving voice commands from the user.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations of the invention have been described. Nevertheless, it will be understood that various modifications can be made without departing from the spirit and scope of the invention.

What is claimed is:

1. A method for previewing data records stored in a database, the method comprising, at a computing device:
displaying, within a user interface, a form view of a current data record, and a scrolling control that includes a slider, wherein:
a current position of the slider corresponds to the current data record, and the slider is followed by a selectable icon associated with performing at least one action;
identifying a first predicted data record in response to a first input that corresponds to a first updated position of the slider;

in response to the first input, overlaying a heads-up display window over the form view of the current data record, wherein the heads-up display window includes at least:
a first data field that displays a first property of the first predicted data record, and
a second data field that displays a second property of the first predicted data record;
identifying a second predicted data record in response to a second input that corresponds to a second updated position of the slider;
in response to determining that (i) the first property of the first predicted data record is equal to a first property of the second predicted data record, and (ii) the second property of the first predicted data record is different from a second property of the second predicted data record:
maintaining the first data field, and
updating the second data field to display the second property of the second predicted data record; and
in response to receiving a selection of the selectable icon:
performing the at least one action in association with the second predicted data record.

2. The method of claim 1, wherein the database is managed by the computing device or a remote entity.

3. The method of claim 1, wherein the heads-up display window is semi-transparent, and at least part of the form view is visible beneath the heads-up display window.

4. The method of claim 1, wherein the heads-up display window includes a control that, when selected, causes a heads-up display layout editor to be displayed, and the heads-up display layout editor enables content displayed within the heads-up display window to be modified.

5. The method of claim 1, wherein at least one of the first input and the second input includes a touch and drag on the slider or a mouse-down and drag on the slider.

6. The method of claim 1, further comprising:
continuously identifying predicted data records in response to inputs that correspond to updated positions of the slider.

7. The method of claim 6, wherein identifying a predicted data record in response to an input that corresponds to an updated position of the slider comprises:
determining a ratio between a count of the data records and a length of the scrolling control as measured in a number of pixels; and
identifying the predicted data record for display in the heads-up display window based on the ratio.

8. The method of claim 1, further comprising, in response to detecting that the second input ceases:
displaying the second predicted data record for display in the form view.

9. The method of claim 8, further comprising:
hiding the heads-up display window.

10. At least one non-transitory storage device storing instructions that, when executed by one or more processors included in a computing device, cause the computing device to display a preview of data records stored in a database, by carrying out steps that include:
displaying, within a user interface, a form view of a current data record, and a scrolling control that includes a slider, wherein:
a current position of the slider corresponds to the current data record, and
the slider is followed by a selectable icon associated with performing at least one action;
identifying a first predicted data record in response to a first input that corresponds to a first updated position of the slider;
in response to the first input, overlaying a heads-up display window over the form view of the current data record, wherein the heads-up display window includes at least:
a first data field that displays a first property of the first predicted data record, and a second data field that displays a second property of the first predicted data record;
identifying a second predicted data record in response to a second input that corresponds to a second updated position of the slider;
in response to determining that (i) the first property of the first predicted data record is equal to a first property of the second predicted data record, and (ii) the second property of the first predicted data record is different from a second property of the second predicted data record:
maintaining the first data field, and
updating the second data field to display the second property of the second predicted data record; and
in response to receiving a selection of the selectable icon:
performing the at least one action in association with the second predicted data record.

11. The at least one non-transitory storage device of claim 10, wherein the database is managed by the computing device or a remote entity.

12. The at least one non-transitory storage device of claim 10, wherein the heads-up display window is semi-transparent, and at least part of the form view is visible beneath the heads-up display window.

13. The at least one non-transitory storage device of claim 10, wherein the heads-up display window includes a control that, when selected, causes a heads-up display layout editor to be displayed, and the heads-up display layout editor enables content displayed within the heads-up display window to be modified.

14. The at least one non-transitory storage device of claim 10, wherein at least one of the first input and the second input includes a touch and drag on the slider or a mouse-down and drag on the slider.

15. The at least one non-transitory storage device of claim 10, wherein the steps further include:
continuously identifying predicted data records in response to inputs that correspond to updated positions of the slider.

16. The at least one non-transitory storage device of claim 15, wherein identifying a predicted data record in response to an input that corresponds to an updated position of the slider comprises:
determining a ratio between a count of the data records and a length of the scrolling control as measured in a number of pixels; and
identifying the predicted data record for display in the heads-up display window based on the ratio.

17. The at least one non-transitory storage device of claim 10, wherein, in response to detecting that the second input ceases, the steps further include:
displaying the second predicted data record for display in the form view.

18. The at least one non-transitory storage device of claim 17, wherein the steps further include:
hiding the heads-up display window.

19. A computing device, comprising:
at least one processor; and at least one memory configured to store instructions that, when executed by the at least one processor, cause the computing device to display a preview of data records stored in a database, by carrying out steps that include:

displaying, within a user interface, a form view of a current data record, and a scrolling control that includes a slider, wherein:
- a current position of the slider corresponds to the current data record, and
- the slider is followed by a selectable icon associated with performing at least one action;

identifying a first predicted data record in response to a first input that corresponds to a first updated position of the slider;

in response to the first input, overlaying a heads-up display window over the form view of the current data record, wherein the heads-up display window includes at least:
- a first data field that displays a first property of the first predicted data record, and
- a second data field that displays a second property of the first predicted data record;

identifying a second predicted data record in response to a second input that corresponds to a second updated position of the slider;

in response to determining that (i) the first property of the first predicted data record is equal to a first property of the second predicted data record, and (ii) the second property of the first predicted data record is different from a second property of the second predicted data record:
- maintaining the first data field, and
- updating the second data field to display the second property of the second predicted data record; and in response to receiving a selection of the selectable icon:
- performing the at least one action in association with the second predicted data record.

20. The computing device of claim 19, wherein the heads-up display window is semi-transparent, and at least part of the form view is visible beneath the heads-up display window.

21. The computing device of claim 19, wherein the heads-up display window includes a control that, when selected, causes a heads-up display layout editor to be displayed, and the heads-up display layout editor enables content displayed within the heads-up display window to be modified.

22. The computing device of claim 19, wherein at least one of the first input and the second input includes a touch and drag on the slider or a mouse-down and drag on the slider.

23. The computing device of claim 19, wherein the steps further include:
continuously identifying predicted data records in response to inputs that correspond to updated positions of the slider.

24. The computing device of claim 23, wherein identifying a predicted data record in response to an input that corresponds to an updated position of the slider comprises:
determining a ratio between a count of the data records and a length of the scrolling control as measured in a number of pixels; and
identifying the predicted data record for display in the heads-up display window based on the ratio.

25. The computing device of claim 19, wherein, in response to detecting that the second input ceases, the steps further include:
displaying the second predicted data record for display in the form view.

26. The computing device of claim 25, wherein the steps further include:
hiding the heads-up display window.

27. The computing device of claim 19, wherein the database is managed by the computing device or a remote entity.

* * * * *